United States Patent [19]

Siepser

[11] Patent Number: 5,380,207
[45] Date of Patent: Jan. 10, 1995

[54] SLIP SUTURE PRACTICE KIT

[76] Inventor: Steven B. Siepser, 866 Downington Pike, West Chester, Pa. 19380

[21] Appl. No.: 172,908

[22] Filed: Dec. 27, 1993

[51] Int. Cl.⁶ .............................................. G09B 23/30
[52] U.S. Cl. .................................... 434/271; 434/270
[58] Field of Search .............. 434/262, 267, 270, 271; 606/1, 148; 623/4

[56] References Cited

U.S. PATENT DOCUMENTS 5,137,459  8/1992  Zirm ..................................... 434/271
5,250,054  10/1993  Li ....................................... 606/148

Primary Examiner—Stephen C. Pellegrino
Assistant Examiner—Gary Jackson
Attorney, Agent, or Firm—Katherine McGuire

[57] ABSTRACT

A kit for practicing ophthalmic suturing technique simulates the anterior portion of a human eye having a torn iris. The kit comprises a workpiece having a planar board with two elastic bands attached at their ends to the board in spaced, parallel relation to one another whereby the lengths of the bands between their ends may be moved with respect to the board. A transparent dome is attached at its perimeter to the board in covering, centered relation to the elastic bands. The dome includes first and second, axially aligned holes formed therethrough with the common axis of the holes extending transversely to the longitudinal extensions of the bands. The space between the elastic bands represents a tear in the iris with the transparent dome representing the anterior portion of an eye. A length of simulated suture is manipulated through the holes in the dome to close the space between the bands using a suture handling tool in the shape of a hooked crochet needle.

11 Claims, 2 Drawing Sheets

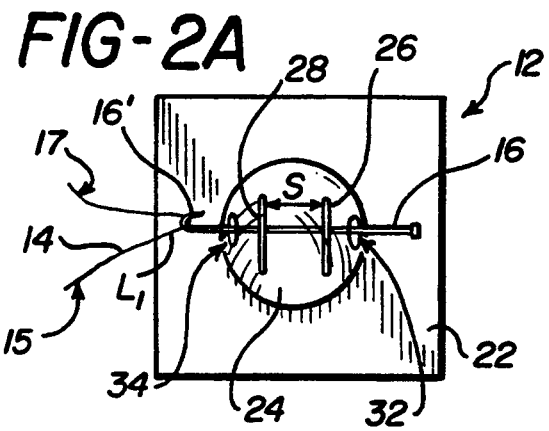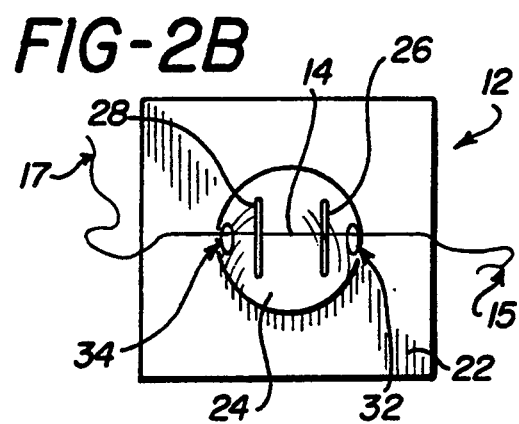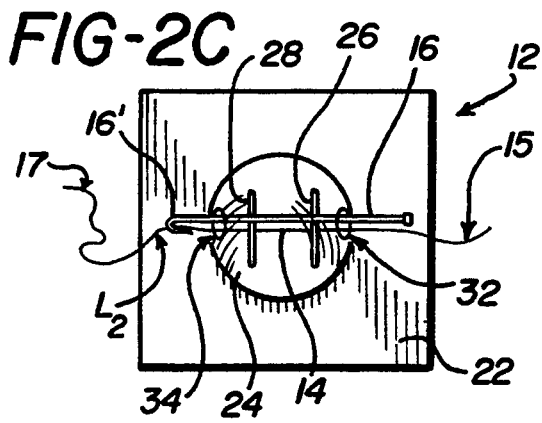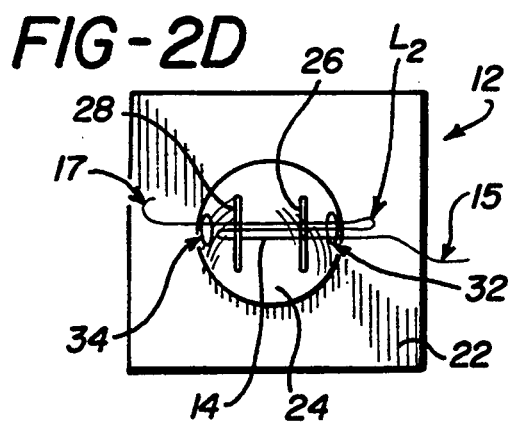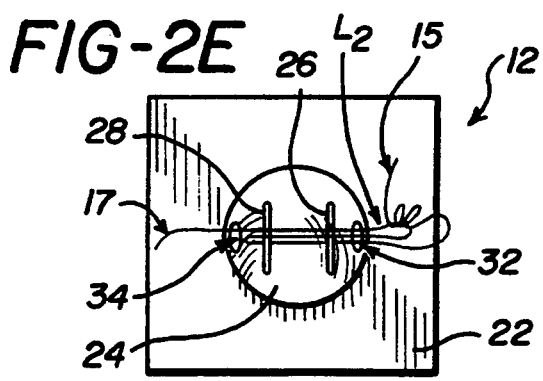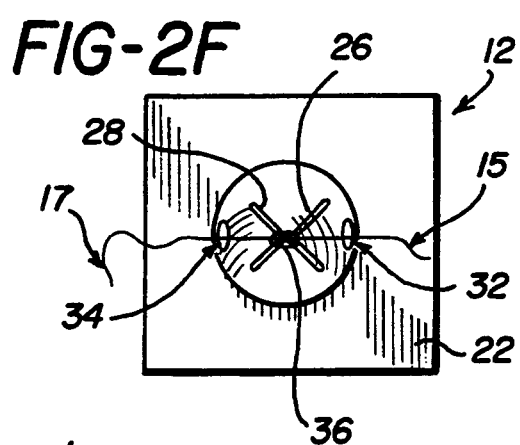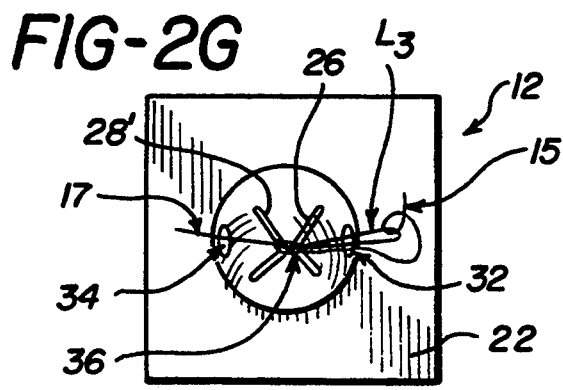

SLIP SUTURE PRACTICE KIT

BACKGROUND OF THE INVENTION

The present invention relates to apparatus for practicing surgical technique, and more specifically to apparatus for use in practicing ophthalmic suturing technique.

An ailment commonly seen in ophthalmic medical practices is that of a tear occurring in the iris of a human eye. The normal operating procedure performed in such cases is to simply close the tear using a square knotted suture. It is, of course, very important that a surgeon performing such an operation close the tear with proper procedure and technique, as failure to properly close the tear may result in irreversible damage to the injured eye. Therefore, the importance of and amount of time a surgeon or student surgeon practices this surgical technique cannot be under-emphasized.

Traditionally, medical students and surgeons hone their clinical operating skills through observing and practicing the actual operation, and with practice comes proficiency. Donated cadaver parts as well as animal parts are typically used to practice surgical techniques. However, since cadaver and animal parts are not always in readily abundant supply, readily available, or readily movable to non-classroom practice sites, there exists a need for practice body parts and tools which can be used to simulate a particular operation technique.

SUMMARY OF THE INVENTION

It is therefore a principal object of the present invention to provide a medical practice kit for medical students and surgeons for practicing operating techniques.

It is a further object of the present invention to provide a medical practice kit of the above type for practicing suturing techniques used in ophthalmic surgeries.

It is another object of the present invention to provide a practice kit of the above type which is used to practice making a suture to close a tear in an iris.

It is yet another object of the present invention to provide a medical practice kit of the above type which accurately simulates repairing a tear of the iris by using a square knotted suture.

It is still another object of the present invention to provide a medical practice kit of the above type which comprises very few and simple parts.

It is yet a further object of the present invention to provide a medical practice kit of the above type which is re-usable, readily transportable, and extremely durable.

Other objects will in part be obvious and in part appear hereinafter.

In accordance with the foregoing objects, the present invention provides a slip suture practice kit for use by medical students and surgeons to practice suturing techniques used in ophthalmic surgeries. The kit is generally comprised of a workpiece which simulates a torn iris in the anterior portion of a human eye, and a suture and suture hooking tool which simulate a length of medical grade suture and a suturing needle, respectively, and which are used to close the simulated iris tear of the workpiece. A sequence of about seven steps utilizing the kit accurately simulates the suturing procedure of closing a tear in an iris through incisions made in the anterior portion of the eye.

The workpiece of the present invention is comprised of a substantially rigid, lightweight board having opposite planar surfaces; a pair of elastic bands each having first and second, opposite ends securely attached to the upwardly facing surface of the board with the bands extending in spaced, parallel relation to one another thereon; and a transparent, semi-spherical dome attached to the top surface of the board in covering, centered relation to the elastic bands. The dome includes two diametrically opposite, axially aligned holes whose common axis extends transverse to the longitudinally extending elastic bands. The two holes permit the suture and suture hooking tool to access the portion of the board housed within the dome.

As previously mentioned, the workpiece is an enlarged representation of the anterior portion of a human eye having a slit iris. The domed portion of the workpiece represents the anterior portion of the eye, while the portion of the board covered by the dome represents the iris of a human eye. The two elastic bands extending parallel to one another in covered relation to the dome represent the portions of iris tissue on opposite sides of a slit, thereby making the space between the bands the representative slit or tear in the iris. Therefore, the bringing together of the two bands accurately simulates the closing of a slit in an iris. Lastly, the holes in the dome represent incisions surgically made in the anterior portion of the eye wherethrough an actual suture needle and suture are passed to access the iris in a real eye.

In the procedure using the instant invention, the representative slit in the iris is closed by tying the two elastic bands together at their centers with the length of simulated suture. This is accomplished by manipulating the hooking tool through the holes in the dome to pull the suture therethrough and securing the elastic bands with a square knotted suture in the manner described more fully below. Although the kit provides a greatly enlarged, less sensitive model of a human eye, the mindset and technique which result from its utilization will improve a medical student's and surgeon's suturing technique in the operating room.

BRIEF DESCRIPTION OF THE DRAWINGS

FIGS. 2A–2G are top plan views of the kit of FIG. 1 illustratively showing the seven steps of the suturing process, respectively.

DETAILED DESCRIPTION

Figure 1:
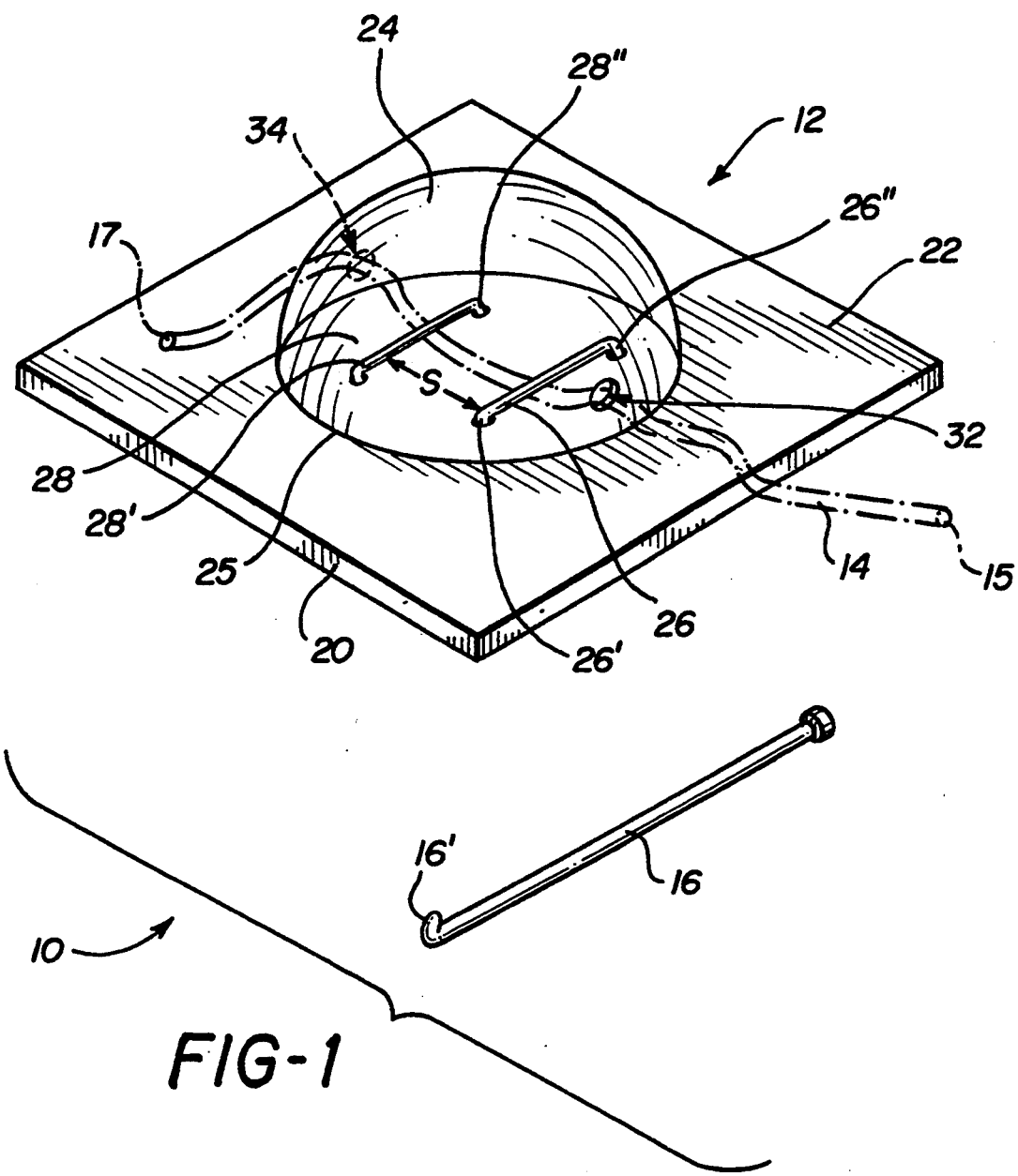
FIG. 1 is a perspective view of the slip suture practice kit.

Referring now to the drawing figures, there is seen in FIG. 1 a kit, denoted generally by reference numeral 10, for practicing a suturing technique typically performed by an ophthalmic surgeon on an iris to close a tear formed therein. Kit 10 is generally comprised of a workpiece 12, an elongated strand of simulated suture 14 having opposite ends 15 and 17, and an elongated suture hooking tool 16. Workpiece 12 is intended to be an enlarged representation of an iris and anterior portion of a human eye, while suture 14 and hooking tool 16 are enlarged representations of suture and a suture needle used in actual surgical practice. These elements of kit 10 are intended to be used by medical students and surgeons, particularly ophthalmic surgeons, to practice suturing technique and procedure.

Workpiece 12 is seen to include a thin, rigid board 20 having a substantially planar, top surface 22; a transparent, semispherical dome 24 securely attached at its circular perimeter 25 to top surface 22; and a pair of elastic bands 26 and 28 having first and second, opposite ends 26', 26" and 28', 28", respectively, securely attached to the top surface 22. Bands 26 and 28 normally extend in parallel, spaced relation to one another along upwardly facing surface 22, and are covered by and centered within dome 24. Due to their elastic properties, the portions of bands 26 and 28 extending between their secured ends 26', 26" and 28', 28" may be moved with respect to board 20 with an implement such as hooking tool 16 as will be described below. Board 20 is preferably composed of polystyrene with thin layers of cardboard adhered in covering relation to its top and bottom surfaces, thus giving board 20 lightweight, durable qualities. The portion of top surface 22 covered by dome 24 is intended to represent an enlarged iris of a human eye with the space S between bands 26 and 28 realistically representing a slit or tear in the iris, and dome 24 including the space therebeneath representing the anterior portion of a human eye (i.e., the lens).

Dome 24 includes a pair of axially aligned holes 32 and 34 whose common axis lies transversely to the parallel, longitudinal extensions of bands 26 and 28. Holes 32 and 34 permit the insertion of suture 14 and hooking tool 16 into the portion of workpiece 12 covered by dome 24. Holes 32 and 34 represent incisions which are formed through the lens of an eye during an actual operation and through which surgical instruments are passed to access the iris and tear.

As previously mentioned, space S between bands 26 and 28 represents a tear in the iris of a human eye. Bands 26 and 28 therefore represent the portions of the iris membrane on the opposite sides of a tear formed therein. The elastic properties of bands 26 and 28 permit the closing of space S by bringing bands 26 and 28 together using suture 14 and hooking tool 16, thus mirroring the actual operating procedure of closing a tear of the iris membrane at the portions thereof defining the tear opening.

A simple seven step suturing procedure seen in FIGS. 2A-2G is followed to bring bands 26 and 28 together, thereby closing space S and thus simulating the actual operating procedure of suturing a tear in an iris of a human eye.

The first step of the procedure is illustrated in FIG. 2A wherein the hooked end 16' of hooking tool 16 is inserted into dome 24 through hole 32, under bands 26 and 28, and exited through hole 34. Suture 14 is then grasped with hooked end 16' at a first length $L_1$ thereof between ends 15 and 17 with one hand of the student/surgeon grasping suture 14 while the other hand manipulates hooking tool 16.

FIG. 2B illustratively shows completion of the second step of the suturing procedure which involves drawing one end 15 of suture 14 through dome 24 under bands 26 and 28 by retracting hooking tool 16 out of holes 32 and 34 in the direction opposite to which it was inserted. This is done with one hand firmly holding opposite suture end 17 so as to not let it be pulled into dome 24. With free ends 15 and 17 of suture 14 thus located on opposite sides of dome 24, they are then manually pulled in opposite directions to tauten the length of suture 14 within dome 24. Steps one and two simulate the actual suturing procedure of inserting a suture needle with a length of suture threaded thereon through an incision made in the lens, piercing the needle through the iris membrane on each side of the tear, and exiting the needle through a second incision made on the opposite side of the lens.

The third step, shown illustratively in FIG. 2C, involves inserting hooked end 16' of tool 16 consecutively through hole 32, over bands 26 and 28 and through hole 34. A second length $L_2$ of suture 14 between end 17 thereof and hole 34 is then grasped with hooked end 16' of tool 16.

Step four involves pulling length $L_2$ through dome 24 by retracting hooking tool 16 out of holes 32 and 34 which thereby pulls the second length $L_2$ of suture 14 out of hole 32 as well. Suture 14 is pulled through hole 32 as far as is necessary for a small loop to be formed out of the second length $L_2$ while still leaving free end 17 adjacent the exterior of hole 34, as seen in FIG. 2D.

Step five of the suturing procedure is seen in FIG. 2E wherein free end 15 is twice passed through the loop formed by the second length $L_2$ of suture 14, thus forming the beginning of a knot.

The sixth step, as seen in FIG. 2F, involves manually pulling free ends 15 and 17 tautly apart which pulls length $L_2$ back through hole 32 to form a knot with and join the center portions of bands 26 and 28 together with suture 14 at 36.

The final step of the suturing process, as seen in the half completed stage in FIG. 2G, involves once again extending hooked end 16' of hooking tool 16 consecutively through holes 32 and 34, over bands 26 and 28, and grasping a third length $L_3$ of suture 14 with hooked end 16' (this part of the step not shown). Hooking tool 16 is then retracted from dome 24, thus drawing the third length $L_3$ of suture 14 through dome 24 and out of hole 32. Again, second end 17 of suture 14 is held with the opposite hand so that it remains adjacent to and exteriorly of hole 34. Third length $L_3$ is thus formed into a small loop located adjacent to and exteriorly of hole 32. Free end 15 is passed through the formed loop of length $L_3$ and ends 15 and 17 are once again pulled tautly apart, thereby forming a reinforcing knot at square knot 36 which securely retains the two bands 26 and 28 together, thus substantially closing space S (i.e., effectively simulating the closing of a slit formed in an iris).

Once the above described procedure has been completed, the knot 36 formed with suture 14 may be easily undone by manipulation thereof with hooking tool 16. Suture 14 can then be entirely withdrawn from workpiece 12 and the suturing procedure described above may be repeated as desired. Due to the durability of kit 10, it may be used to practice ophthalmic suturing technique of the type described above for many years.

What is claimed is:

1. A kit for practicing suturing technique using a length of suture and an elongated suture handling tool, said kit comprising:
   a) a board having a planar surface;
   b) at least two elastic bands each having first and second opposite ends, said first and second ends securely fastened to said planar surface of said board, said bands extending in spaced, non-intersecting relation to one another along said planar surface thereby defining a spaced region therebetween; and
   c) a transparent, rigid dome fixedly attached to said planar surface in covering relation to said bands, said dome including at least two axially aligned holes formed therethrough.

2. The invention according to claim 1 wherein said at least two elastic bands extend in parallel, spaced relation to one another.

3. The invention according to claim 2 wherein the common axis of said axially aligned holes extends transverse to the longitudinal extension of said at least two elastic bands.

4. The invention according to claim 1 wherein said dome is semi-spherical.

5. The invention according to claim 1 wherein said board is composed of a polystyrene composition.

6. A kit for practicing suturing technique comprising:
 a) a board having a planar surface;
 b) at least two elastic bands each having first and second opposite ends, said first and second ends securely fastened to said planar surface of said board, said bands extending in spaced, non-intersecting relation to one another along said planar surface thereby defining a spaced region therebetween;
 c) a transparent, rigid dome fixedly attached to said planar surface in covering relation to said bands, said dome including at least two axially aligned holes formed therethrough;
 d) a length of flexible string; and
 e) an elongated suture handling tool.

7. The invention according to claim 6 wherein said at least two elastic bands extend in parallel, spaced relation to one another.

8. The invention according to claim 7 wherein the common axis of said axially aligned holes extends transverse to the longitudinal extension of said at least two elastic bands.

9. The invention according to claim 7 wherein said dome is semi-spherical.

10. A method for practicing a suturing technique using a length of suture having first and second, opposite ends, an elongated suture handling tool, and a workpiece, said workpiece comprising a board with an upwardly facing, planar surface; a transparent dome having first and second, axially aligned holes with the perimeter of said dome attached to said planar surface, and at least two elastic bands each having first and second, opposite ends securely fastened to said upwardly facing, planar surface with said bands extending in spaced, non-intersecting relation to one another, said dome being positioned on said planar surface in covering relation to said at least two elastic bands, said method comprising the steps of:
 a) extending said suture handling tool consecutively through said first hole, under said at least two elastic bands between said first and second ends thereof, respectively, and said second hole, and grasping a first length of said suture with said suture handling tool between said first and second ends thereof;
 b) retracting said suture handling tool out of said first and second holes while holding said first end of said suture adjacent to and exteriorly of said second hole, said handling tool drawing said second end of said suture out of said first hole, and pulling said first and second ends of said suture tautly apart whereby said first and second ends of said suture are respectively adjacent said second and first holes;
 c) extending said suture handling tool a first time consecutively through said first hole, over said at least two elastic bands, and said second hole, and grasping a second length of said suture with said suture handling tool;
 d) retracting said suture handling tool out of said first and second holes while holding said first end of said suture adjacent said second hole, and forming a first loop adjacent to and exteriorly of said first hole with said second length of said suture;
 e) passing said first end of said suture through said first loop at least once; and
 f) pulling said first and second ends of said suture tautly apart thereby pulling said second length of said suture through said first hole and joining said at least two elastic bands together with said suture forming a first knot at the juncture of said at least two elastic bands.

11. The invention according to claim 10 further including the steps of:
 g) extending said suture handling tool a second time consecutively through said first hole, over said at least two elastic bands, and said second hole, and grasping a third length of said suture with said suture handling tool;
 h) retracting said suture handling tool out of said first and second holes while holding said first end of said suture adjacent said second hole, and forming a second loop adjacent to and exteriorly of said first hole with said third length of said suture;
 i) passing said first end of said suture through said second loop at least once; and
 j) pulling said first and second ends of said suture tautly apart thereby pulling said third length of said suture through said first hole and forming a second knot at said juncture of said at least two elastic bands.

* * * * *